May 21, 1963

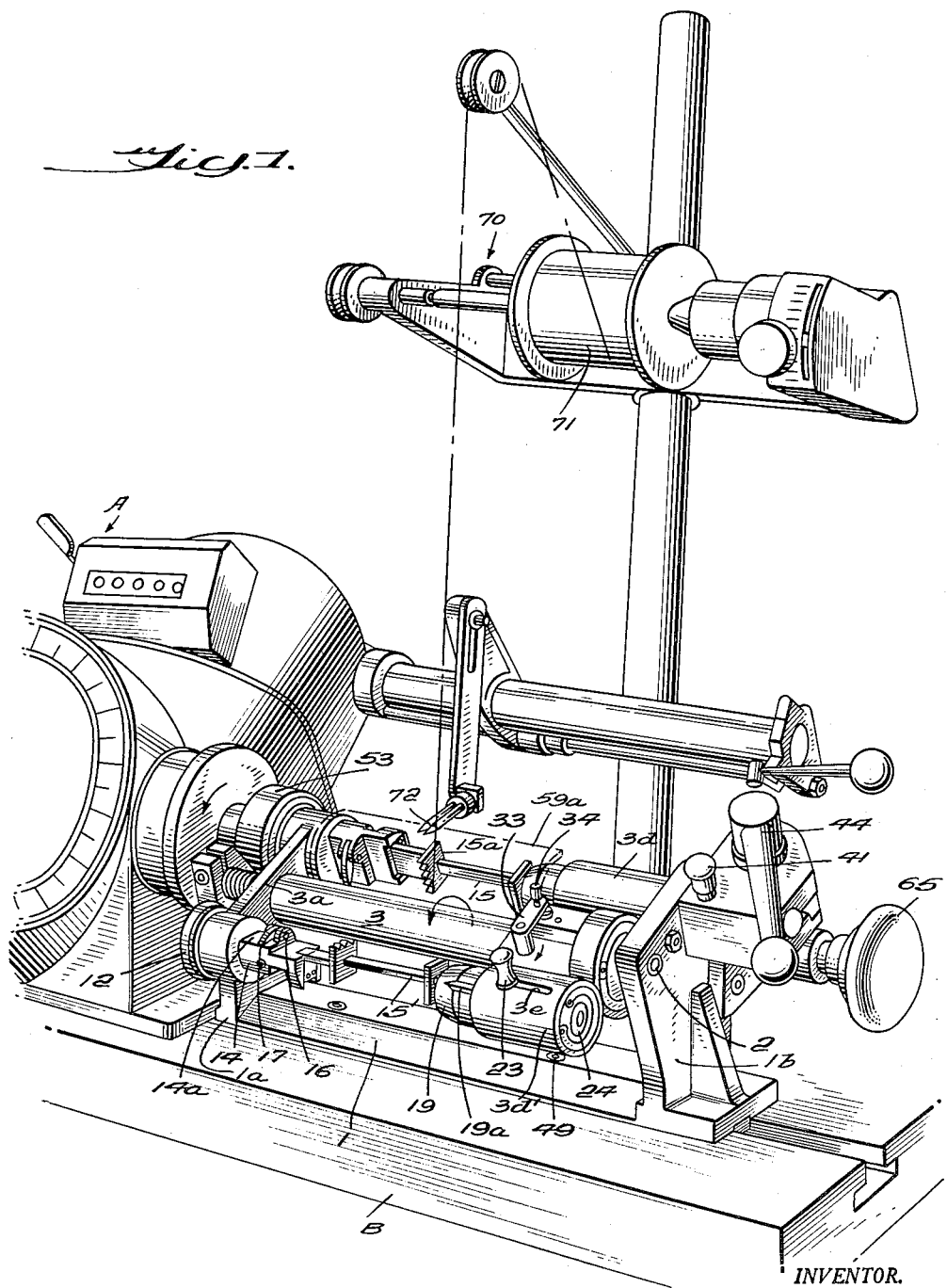

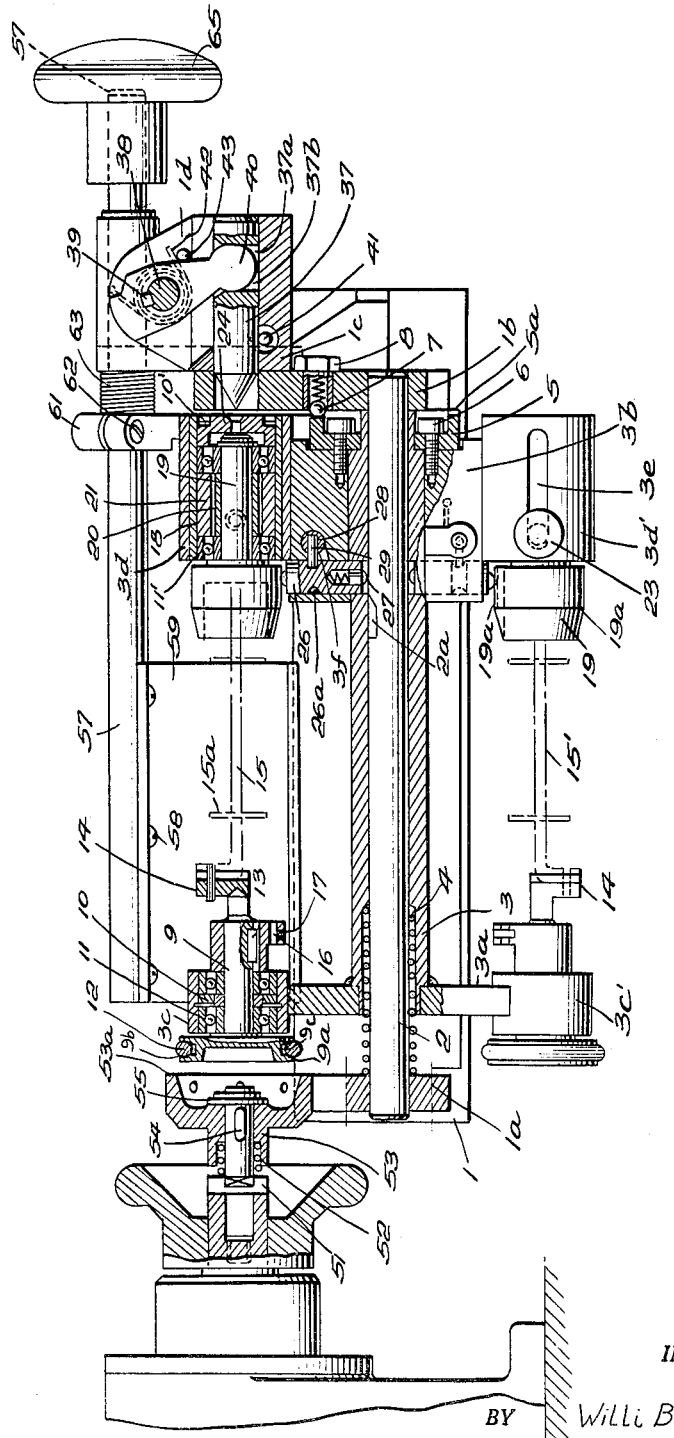

W. BEUSHAUSEN 3,090,569

AUXILIARY ATTACHMENT FOR LAYER WINDING MACHINES FOR
WINDING COILS ON RELAY CORES AND THE LIKE

Filed June 25, 1962

INVENTOR.
Willi Beushausen

United States Patent Office 3,090,569
Patented May 21, 1963

3,090,569
AUXILIARY ATTACHMENT FOR LAYER WINDING MACHINES FOR WINDING COILS ON RELAY CORES AND THE LIKE
Willi Beushausen, Zurich, Switzerland, assignor to Micafil A.-G., Zurich, Switzerland, a joint-stock company
Filed June 25, 1962, Ser. No. 204,857
11 Claims. (Cl. 242—9)

The present invention relates to apparatus for winding coils on relay cores and the like and more particularly to an auxiliary and substantially self-contained device which can be attached to a conventional layer winding machine and operatively coupled thereto without making any structural changes in the winding machine itself. The purpose of the auxiliary device is to accelerate the winding, balancing and soldering of the coils and these functions, including the necessary preparatory operations of mounting the cores to be wound are all coordinated in such manner as to reduce to a minimum the standstill or idle time of the machine between successive coil winding operations.

It is known, of course, to clamp a relay core between a driving dog on the headstock of a conventional layer winding machine and a counter-point on the tailstock, in order to wind a coil on the core. Aside from the secondary jobs which are necessary to be done while the machine is at standstill, such as insertion and removal of the relay core, insertion of core insulation and drawing in the wire to the core at the beginning of the winding operation, as well as soldering, the job of balancing can be carried out only with great difficulty, or not at all, particularly in the case when winding with very thin wire. Usually the jobs of balancing and soldering are not done on the same machine used for winding the coils but rather are carried out on a second device provided with easily rotatable receiving parts for the wound core. In the situation where all secondary jobs, that is those jobs other than winding the coil on the core itself, are carried out on the same machine as is used for winding the coil, both the machine and the operator are not used to the best efficiency since the standstill time for the machine is very high as compared with the time required by the machine for actually putting the required number of coil turns on the core. In a case where the secondary jobs of balancing and soldering are carried out on a separate device, a further servicing operation is necessary. As to the known state of technology in this field, reference may be had to the apparatus described in the professional publication "Elektrotechnik," of April 27, 1957, at page 128, for the winding of coreless coil bodies.

In accordance with the present invention, the standstill time of the machine between successive coil winding operation is reduced appreciably by use of a novel, self-contained auxiliary device which includes rotatable means for supporting two cores on the machine and presenting these cores in sequence to the driving member on the headstock of the machine for winding of the coil. While one core is being wound, the finishing operations such as balancing and soldering of the previously wound core are carried out, and this finished core is then removed and replaced with an empty core ready to be wound. The rotatable support means for the two cores are located on axes displaced 180° apart about an auxiliary axis which is disposed laterally of and parallel with the main, coil winding axis of the main machine, and these rotatable core support means are carried by a member which can be indexed by 180° about that auxiliary axis so as to enable each core and its support axis to be brought into a position coaxial with the rotational axis of the driving member on the headstock of the main machine after which the rotatable support means for the core to be wound is then coupled to the driving means in the headstock of the machine.

The self-contained auxiliary device in accordance with the invention includes means for locking and unlocking the rotatable support means for each core so as to enable each such support means to be unlocked for free rotation thereof automatically prior to starting the coil winding operation, and also to be locked and unlocked manually after the coil has been wound on the core and removed from the winding position, for purposes of soldering and balancing. Moreover, the invention includes a protective glass plate which can be swung manually into a position covering the core while it is being wound, this glass plate being releasable automatically as the rotatable core support, after the core is wound, is uncoupled from the headstock of the main machine.

The foregoing as well as other structural features and advantages inherent in the invention will become more apparent from the following detailed description of a preferred embodiment thereof and from the accompanying drawings which illustrate the same. In these drawings:

FIG. 1 is a view in perspective of the improved auxiliary device in place on a conventional layer-winding machine;

FIG. 2 is a longitudinal sectional view showing the auxiliary device in a rest position, i.e. a position adapted prior to coupling a relay or similar core to the driving member of the headstock of the machine;

FIG. 3 is an end view of the auxiliary device as seen from the right in FIG. 1;

FIG. 4 is view in cross section of that part of the auxiliary device which includes the stop bolt that controls rotation of the member on which are mounted the relay cores to be wound; and FIG. 5 is a view of that portion of the device as described with respect to FIG. 4 but seen in a top plan.

With reference now to the drawings and to FIG. 1 in particular, the layer-winding machine includes a head portion A of conventional construction which is carried at the left end of a bed B, the latter being provided with a conventional way extending longitudinally in the top face thereof. The auxiliary device to which the invention relates is a self-contained structure mounted on a bearing stand 1 which is coupled into the way on the bed B by means to be later described. Bearing stand 1 includes bearing support plates 1a, 1b upstanding at each end thereof, and between these support plates a horizontal and stationary axle 2 is mounted, this axle being shown more clearly in FIG. 2. Rotatably mounted on axle 2 is a tubular support member 3 which carries cross arms 3a, 3b extending laterally outward. Located between the left bearing support plate 1a and received partially in a counterbore in tubular member 3 is a compression spring 4 surrounding axle 2. The left end of this spring 4 as viewed in FIG. 2 presses against the bearing support plate 1a and the right end of the spring presses against a shoulder within the counter bore in member 3 so as to bias the latter to the right as viewed in FIG. 2, which is its uncoupled position relative to the driving means in the headstock of the main machine, and which will be explained in further detail later.

Located at the right end of the member 3 is a stop disc 5 which is attached thereto by means of two stud bolts 6. Disc 5 is provided with two axially extending recesses 5a located 180° apart as referred to the axis of rotation of member 3 which function as detents in cooperation with a spring loaded ball 7 of a stop device 8. The spring loaded ball 7 when engaged in one of the recesses 5a characterizes the rotational position of the member 3 essential to coupling of the auxiliary device with the headstock drive of the layer winding machine. At the left end of the member 3 as seen in FIGS. 1 and 2 on the outer ends of arm 3a extending laterally therefrom are eyes 3c and 3c'. Mounted rotatably within each eye 3c, 3c' is a coupling shaft 9 of the corresponding core support, this shaft being supported for rotation within the inner races of two axially spaced sets of ball bearings 11 which are secured axially by means of a lock washer 10. The left end of each coupling shaft 9 terminates externally of the left side of the eyes 3c, 3c' in a circular flange 9a which includes a peripheral groove 9b having a semicircular cross section in which is received a rubber ring 12 under a slight stress which functions as an element for drivingly coupling the rotatable core support to the headstock of the layer winding machine. To prevent the rubber ring 12 from slipping circumferentially in its groove, a plurality of uniformly circumferentially spaced bores 9c, for example, six to eight, may be drilled radially inward from the base of groove 9b into the body of the flange so that the inner periphery of the ring 12 will be pressed against the edges of these bores 9c and slightly deformed to establish a non-slip relationship as radially inward pressure is applied against the outer periphery of ring 12 by a frictional drive therefor on the headstock to be later explained.

That part of each coupling shaft 9 which projects from the right side of each eye 3c, 3c' has mounted thereon a dog 14 which is secured to the shaft 9 by means of a key 13, this dog serving the function of drivingly engaging the left end of the relay cores 15, 15' which are to be wound in succession. The left portion of each dog 14 as viewed in FIG. 1 is provided with a surface 14a on which a lever 17 held by a pin 16 is located and under which, as shown in FIG. 1, the beginning part of the wire coil to be wound on the core, is clamped.

At the right end of the member 3 as seen in FIGS. 1 and 2 on the outer ends of arm 3b extending laterally therefrom are eyes 3d, 3d' which are also located 180° apart as related to the axis of rotation of member 3 and are aligned with eyes 3c, 3c'. Located within each of these eyes 3d, 3d' is an axially displaceable sleeve 18 having a receiving part 19 for the right ends of the relay cores 15, 15' to be mounted for coil winding thereon. Each receiving part 19 is mounted rotationally within its eye 3d, 3d' by means of two sets of axially spaced ball bearings 11', this axial spacing being established by inner and outer bushings 20, 21 which surround the shaft of the receiving part 19 and are located between the two sets of bearings, the inner bushing 20 engaging the inner race of each bearing and the outer bushing 21 engaging the outer race of each bearing. Sleeve 18 is secured to the outer bushing 21 by means of a bolt 23 which projects through an axially extending slot 3e in the wall of each eye 3d, 3d'. At the right side of sleeve 18 is located a disc 24 which bears against the outer race of one ball bearing 11' and is provided with a centering bore to receive a counter-point 37. This disc 24 is secured in place by a locking ring 10'.

Cooperative with each of the receiving parts 19 is a bolt 26 loaded by a spring 25, the bolts 26 being located in radially extending bores in the cross arm 3b of the member 3 and being displaceable in a radial direction. The details of this construction are shown to a larger scale in FIG. 5. The outer end of each bolt 26 is adapted to engage in one or the other of two wedge-shaped recesses 19a provided in the periphery of the receiving parts 19, these recesses 19a extending axially and being located 180° apart as related to the axis of rotation of the parts 19.

As shown in FIGS. 2 and 5, between the radially inner end of each loading spring 25 and the axle 2 is arranged a radially movable pin 27 which is adapted to drop into an axially extending recess 2a in the upper side of this axle when the member 3 is shifted from the rest position, the position shown in the drawing, to the left into its coupling position.

As shown in FIGS. 4 and 5, an axle 28 is mounted in cross arm 3b perpendicular to the longitudinal axis of each bolt 26, each axle 28 having a dog pin 29 extending laterally therefrom and which engages a peripheral groove 26a of semi-circular cross section in bolt 26. Cross arm 3b at the right end of the member 3 is provided with recesses 3f, as shown in FIG. 2 to provide sufficient space for movement of each dog pin 29. At the left end of each axle 28, as viewed in FIG. 4, i.e. on the end remote from the servicing side of the machine, a torsion spring 31 surrounds axle 28 and is secured in place on the axle between a lock washer 30 and the cross arm 3b. One end of torsion spring 31 is anchored in a slot 28a in the end face of axle 28 and the other end of spring 31 is anchored in a bore 3g in the arm 3b. The force produced by torsion spring 31 on the dog pin 29 applied through axle 28 works against the force of spring 25 in the interior of bolt 26. When the member 3 is shifted to the left from the position shown in FIG. 2 so that pin 27 drops into slot 2a in axle 2, the radially inward stop position of bolt 26 releasing it from recess 19a is brought about automatically as a result of rotation of axle 28 in the direction indicated by the arrow in FIG. 5 by spring 31, the force of which overcomes the opposing force of spring 25.

Located at the right end of axle 28, i.e. on the servicing side of the machine as viewed in FIG. 1, is a hand lever 33 fixed to axle 28 by means of a pin 32. Mounted in a bore in the free end of lever 33 is a bolt 34 which as shown in FIG. 4 is movable toward a bore 3h in the coupling member 3 as bolt 34 is pressed in that direction by means of a knob 34a on the opposite end against a slight counter force of a biasing spring 35 which urges movement of bolt 34 in the opposite direction and which is limited by a stop collar 36 surrounding bolt 34 and which bears against a face of hand lever 33. By turning hand lever 33 in a clockwise direction, the receiving part 19 can also be manually released from its associated bolt 26. In this position, hand lever 33 comes into alignment with and engages the bore 3h in the coupling member 3 so that when the bolt 34 is pressed downward, a stoppage of the hand lever 33 is achieved.

Located on the right-hand bearing stand support 1b is a further eye 1c in a bore of which is located an axially displaceable counter-point 37, shown in FIGS. 2 and 3 which is arranged concentrically with the drive shaft in the headstock of the machine. The right hand portion of the counter-point 37 is provided with a recess 37a of rectangular configuration distributed uniformly around the middle axis, and additionally from below with a semi-circular recess 37b. An articulation lever 40 projecting outwardly from shaft 38 to which it is secured by means of a wedge key 39 engages in the recess 37a in counter-point 37 so as to shift the latter back and forth in its bore. A hand lever 44 is secured to shaft 38 to rotate the latter about its axis and hence, effect longitudinal movement of counter-point 37. A lock disc 45 is secured to the lower end of shaft 38 to prevent any axial movement thereof. A torsion spring 42 arranged around shaft 38 has one end hooked into the articulation lever 40 and the other end secured to shaft 38 so as to always urge the articulation lever 40 to shift to the right so as to lie against the stop pin 43.

A catch bolt 41 is slidably mounted in another bore in the eye 1c and cooperates with the recess 37b in counter-point 37 to block the latter against longitudinal movement when a relay core is being wound. The upper end of bolt 41 is provided with a knob and a lock disc 46 is fitted onto the lower end of bolt 41 to function as a stop. A compression spring 47 surrounds bolt 41 and is arranged to apply a force loading the bolt 41 towards its upper position. Bolt 41 lies against the surface of counter-point 37 with the shoulder resulting from a recess 41a in the bolt. At the moment when the recess 37b of counter-point 37 comes into alignment with the catch bolt 41 as counter-point 37 is shifted to the left, the bolt 41 will be pushed upward by spring 47 and thus block any further longitudinal movement of the counter-point. By pressing downwardly upon catch bolt 41, the counter-point 37 can be released again and returned automatically to its back position after a core has been wound, by the biasing force of torsion spring 42.

On the underside of the bearing stand 1 and in fact exactly beneath the bore for counter-point 37, a wedge 48 is pressed into a T-shaped way in bed B and this wedge 48 determines the lateral position of the device. By means of two stud bolts 49 passing through the base plate of the bearing stand 1 and screwed into the wedge block 50, as shown in FIGS. 1 and 3, the device is attached on the machine.

As shown in FIG. 2, a connection piece 51 is firmly screwed onto the drive shaft of the headstock of the winding machine. This connection piece 51 is provided with a key 54 and on it is mounted an axially displaceable coupling bell 53 held on by a lock disc 55. A compression spring 52 placed between a shoulder on coupling piece 51 and coupling bell 53 produces the axial force necessary to establish a satisfactory friction drive between the bell 53 and rubber ring 12 on the coupling shaft 9. However, if desired, the periphery of the conical recess in coupling bell 53 may be provided with a plurality, e.g. from six to eight, uniformly circumferentially spaced bores 53a extending gradually outward in order to prevent any slippage between the bell surface and that of ring 12.

As a protection against wire or solder particles flying away during winding of the coil, as a result of centrifugal force due to rapid rotation of the core, a protective glass plate 59 is arranged at the back side of the device, the glass plate 59 being mounted along one side thereof by screws 58 on a shaft 57 which is mounted for rotation in a bearing support 56. The latter can be fastened to the bearing stand support part 1b by means of two screws 60. The shaft 57 is secured axially outside the bearing point from the right by a lock disc and from the left by a clamping lever 61 secured by means of screws 62. On the right, as viewed in FIG. 2, next to clamping lever 61 is a torsion spring 63 on a tubular like attachment on the bearing support 56. Spring 63 causes the clamping lever in the rest position to press downward on a rubber-reinforced stop 64 located on the bearing support 56. For the purpose of manual actuation, a manually operated knob 65 is secured to the right end of shaft 57 as viewed in FIG. 2. The clamping lever 61 terminates on the right side with a projecting lug. On the left, from the front side, a ball 67 loaded by a compression spring 66 is introduced. While, during the upswing of glass plate 59, the spring pressed ball 67 engages under the pushed forward counter-point 37, the lug hits against it, and the working position of the protective glass plate 59 is effected. The semi-circularly curved part 59a of this plate when in working position covers the relay core being wound, from below, from in front and partially from above. Since the protective glass plate 59 comes into position when the counter-point 37 is pushed to the left as viewed in FIG. 2, its working position can be assumed only when the device is in its coupled state as regards the winding machine. Consequently, the protective glass plate 59 falls back to its rest or non-working position simultaneously when the device is uncoupled by action of the torsion spring 63.

The winding machine is equipped with a pivoted head 70 on which is rotatably mounted a wire supply roll 71 and is also provided with a conventional wire guide fork 72.

Before proceeding with an explanation of the manner in which the device in accordance with the invention operates, it will now be clear that the support member 3 which is rotatable manually on axle 2, has laterally extending arms 3a, 3b at opposite ends thereof and that these arms establish rotatable support means for relay or other cores 15, 15' to be wound in succession, on axes located 180° apart about an auxiliary axis, i.e. the axis of axle 2, disposed laterally of and parallel with the main drive axis of the winding machine established between the driving bell 53 and counter-point 37.

The insertion of a relay core to be wound takes place in the rest position of the member 3 wherein the latter occupies its rightmost position and the cross arms 3a, 3b assume a position inclined downwardly from horizontal by about 30° as seen from FIG. 3. After the sleeve 18 has been displaced to the right by means of bolt 23, the relay core 15 can be conveniently inserted into the dog 14.

When the sleeve 18 is shifted back to the left, the necessary counter bearing for the relay core 15 in the receiving part 19 is effected automatically. At the same time, by rotating coupling shaft 9 until bolt 26 enters recess 19a, the receiving part 19 is brought into the necessary rest position. Thereupon, the support member 3 is turned on its axle 2 by 180° in the direction of the arrow into a second rest position which is the position shown in the drawing. In this position, the axes of all rotating parts including that of the relay core 15, come to lie concentric with the axis of the machine shaft between the driving bell 53 and counter-point 37. By rotating hand lever 44 in such direction as to shift counter-point 37 to the left, the member 3, loaded by compression spring 4 to the right, is displaced to the left until flange 9a and ring 12 enter driving bell 53 thus frictionally coupling these members. At the same time, the catch effect of bolt 26 on the receiving part 19 is released as pin 27 drops into recess 2a in stationary axle 2 and dog 29 retracts bolt 26 to release the same from recess 19a.

The coupled position of member 3 to driving bell 53 is maintained by upward movement of catch bolt 41 which blocks the counter-point 37 against movement in both directions. Not until now does the operator attach the end of the wire in place on the relay core 15 to be wound. This is done by drawing the wire off the supply roll between the legs of the wire guide fork 72 into a recess in the left flange 15a of relay core 15 and from here with a turn to the left under the spring-loaded lever 17, the end of the wire in the hand being torn off by a sharp pull around the lever. While glass plate 59 is being swung upwards from its rest position into the protective position by turning knob 65, and latched in that position, the winding machine can be switched on to start winding of relay core 16.

While one relay core 15 is being wound, another relay core 15' can be secured in place on the member 3 in the same manner as before described with respect to core 15. After the relay core 15 being wound has received the desired number of turns of wire, the winding machine is stopped automatically in accordance with known arrangements. By exerting a light pressure on catch bolt 41, unblocking of the counter-point 37 is begun whereupon with hand lever 44 and the counter-point 37 being allowed to retract to the right to the rest position, the member 3 shifts to the right from the coupled position with driving bell 53 back into the rest or uncoupled position by action of spring 4, and the protective glass plate 59 automatically falls back into the non-operative position. After rotating the member 3 on axle 2 into the next rest position and again actuating hand lever 44, the other relay core 15' is already in the starting position preceding winding of the coil thereon. The wire from the supply roll 71 which at this time is still connected with the previously wound coil on core 15 is now torn off the coil and drawn in and attached in the manner previously described to the next core 15' to be wound. After the protective glass plate 59 is again swung into the working position, winding of the coil on the relay core 15' can be started. By turning lever 33 in the direction of the arrow so as to withdraw bolt 26 from recess 19a and subsequently pressing down upon bolt 34, the receiving part 19 associated with the wound core 15 is released for rotation so that the wound core can be balanced while blocking again of the receiving part 19 against rotation for the concluding soldering work can be effected by simply pulling upwardly on bolt 34. With an exchange of a finished, wound relay core 15 for an unwound one, the operating sequence described above is then repeated.

I claim:

1. A supplementary device adapted for attachment to a winding machine having a bed and a headstock on said bed including a rotary driving member, said supplementary device comprising a bearing stand, means for securing said bearing stand in place on the bed of said machine, a main support member having laterally extending arms at opposite ends thereof, means mounting said main support member on said bearing stand for displacement along and rotation about an axis parallel with and laterally to one side of a projection of the axis of the rotary driving member of the machine, a pair of rotatable core supporting means mounted on the arms of said main support member for rotation on axes disposed 180° apart about and parallel to the axis of rotation of said main support member so as to bring the axis of each said rotatable core supporting means in alternation into coincidence with the axis of rotation of the rotary driving member upon rotation of said main support member, each said rotatable core supporting means including a dog for mounting the corresponding core and means for coupling the core supporting means to the rotary driving member of the machine upon displacement of said main support member along its axis, and a counter-point mounted on said bearing stand for longitudinal displacement along an axis coincident with the axis of rotation of the rotary driving member of the machine for cooperation with each of said core supporting means and for displacing said main support member in such direction as to effect a rotary driving coupling between one of said core supporting means and the rotary driving member of the machine.

2. A supplementary device for a winding machine as defined in claim 1 and which further includes spring means cooperative with said main support member for biasing the same to a rest position in which said rotatable core supporting means are uncoupled from the rotary driving member of the machine.

3. A supplementary device for a winding machine as defined in claim 1 wherein said means mounting said main support member include a stationary axle upon which said main support member can rotate and also be displaced longitudinally, and which further includes indexing means displaced 180° apart for facilitating 180° rotary movements of said main support member, and spring means cooperative with said main support member for biasing the same to a rest position in which said rotatable core supporting means are uncoupled from the rotary driving member of the machine.

4. A supplementary device for a winding machine as defined in claim 1 and which further includes an arcuate protective glass plate and means for rotating said glass plate into a protective position partially surrounding that particular core supporting means which is then coupled to the rotary driving member of the machine.

5. A supplementary device for a winding machine as defined in claim 1 and which further includes a hand lever mechanically coupled to said counter-point for effecting the said longitudinal displacement thereof and a spring loaded catch bolt cooperative with said counter-point for locking the same against any further longitudinal displacement after said core supporting means has been coupled to the rotary driving member of the machine.

6. A supplementary device for a winding machine as defined in claim 1 and which further includes bolt means mounted on the arms at one end of said main support member individual to and cooperative with the corresponding core supporting means for locking the latter against rotation.

7. A supplementary device for a winding machine as defined in claim 6 and which further includes means for automatically actuating said bolt means to unlock the corresponding core supporting means upon displacement of said main support member in the direction effecting coupling of the core supporting means to the rotary driving member of the machine.

8. A supplementary device for a winding machine as defined in claim 1 and which further includes bolt means mounted on the arms at one end of said main support member individual to and cooperative with the corresponding core supporting means for locking the latter against rotation, manually operable means for actuating said bolt means in such direction as to unlock that core supporting means which is not coupled to the rotary driving member of the machine, and means also automatically actuating said bolt means to unlock the other core supporting means upon displacement of said main support member in the direction effecting coupling of said other core supporting means to the rotary driving member of the machine.

9. A supplementary device for a winding machine as defined in claim 1 and which further includes an arcuate protective glass plate mounted for rotation from a rest position into a protective position partially covering the particular core supporting means which is then coupled to the rotary driving member of the machine, and means cooperative with said counter-point for latching said glass plate in its protective position when said counter-point is displaced in the direction as to effect coupling of said core supporting means to the rotary driving member of the machine and for automatically unlatching said glass plate so as to shift back to its rest position when said counter-point is displaced in the opposite direction.

10. A supplementary device for a winding machine as defined in claim 1 wherein said means mounting said main support member include a stationary axle upon which said main support member can rotate and also be displaced longitudinally, said axle having an axially extending slot in the surface thereof, and which further includes radially movable bolt means mounted on the arms at one end of said main support member individual to and cooperative with the corresponding core supporting means for locking the latter against rotation, each said bolt means including a bolt member having a longitudinal bore therein, a spring loaded pin slidable in said bore, said pin being loaded by said spring into engagement with the surface of said axle and being aligned with the slot therein so as to drop into the slot upon longitudinal displacement of said main support member in the direction to couple the core supporting means to the rotary driving member of the machine, and a manually operable means coupled to each said bolt means for actuating the same against a counter force exerted by the spring loading the pin therein to unlock the bolt from the corresponding core supporting means.

11. A supplementary device for a winding machine as defined in claim 10 wherein said manually operable means coupled to each said bolt means includes a hand lever secured to a rotary shaft having a dog pin engaged with the corresponding bolt means, a torsion spring exerting a torque on said rotary shaft in such direction as to unlock said bolt means from the corresponding core supporting means automatically as soon as the pin in the bolt means drops into the slot in said axle, and means for latching said hand lever to latch the rotary shaft in a position wherein said bolt means is unlocked from the corresponding core supporting means.

References Cited in the file of this patent
UNITED STATES PATENTS

| | | |
|---|---|---|
| 432,233 | Fowler et al. | July 15, 1890 |
| 2,120,944 | Sedgley | July 14, 1938 |